(12) United States Patent
Weitenberg et al.

(10) Patent No.: US 10,398,080 B2
(45) Date of Patent: Sep. 3, 2019

(54) MULCHING DEVICE FOR PROCESSING PLANT STUBBLE ON A FIELD

(71) Applicant: Deere & Company, Moline, IL (US)

(72) Inventors: Clemens Weitenberg, Borken (DE); Juergen Effsing, Ahaus (DE); Bernd-Clint Hungerhoff, Borken (DE); Marco Messing, Stadtlohn (DE); Paul Loebbing, Reken (DE); Michael Schlamann, Stadtlohn (DE)

(73) Assignee: DEERE & COMPANY, Moline, IL (US)

( * ) Notice: Subject to any disclaimer, the term of this patent is extended or adjusted under 35 U.S.C. 154(b) by 21 days.

(21) Appl. No.: 15/653,093

(22) Filed: Jul. 18, 2017

(65) Prior Publication Data
US 2018/0020617 A1 Jan. 25, 2018

(30) Foreign Application Priority Data

Jul. 20, 2016 (DE) .......................... 10 2016 213 260
Aug. 2, 2016 (DE) .......................... 10 2016 214 256
May 2, 2017 (DE) .......................... 10 2017 207 337

(51) Int. Cl.
| | | |
|---|---|---|
| *A01D 34/835* | (2006.01) | |
| *A01D 34/66* | (2006.01) | |
| *A01D 34/71* | (2006.01) | |
| *A01D 34/74* | (2006.01) | |
| *A01D 45/02* | (2006.01) | |

(52) U.S. Cl.
CPC ......... *A01D 34/8355* (2013.01); *A01D 34/66* (2013.01); *A01D 34/71* (2013.01); *A01D 34/74* (2013.01); *A01D 45/028* (2013.01)

(58) Field of Classification Search
CPC .... A01D 34/8355; A01D 34/66; A01D 34/71; A01D 34/74; A01D 45/028; A01D 45/021; A01G 23/067
See application file for complete search history.

(56) References Cited

U.S. PATENT DOCUMENTS 3,982,384 A * 9/1976 Rohweder ............ A01D 45/021
56/106
4,178,744 A * 12/1979 Allely ................... A01D 34/661
56/13.6
4,178,746 A * 12/1979 Allely ................... A01D 34/661
56/13.6

(Continued)

FOREIGN PATENT DOCUMENTS

DE 3515295 A1 10/1986
DE 3934862 A1 4/1991
(Continued)

OTHER PUBLICATIONS

European Search Report issued in counterpart application No. 17169037.3 dated Nov. 21, 2017. (7 pages).

(Continued)

*Primary Examiner* — Arpad Fabian-Kovacs

(57) ABSTRACT

A mulching device is equipped with a tool that can be set into rotation about an axis of rotation tilted upwards and to the rear in order to process plant stubble. The rotational direction of the tool can be selected such that the tool is pressed back out of the ground by the driving torque in the event of an overload.

6 Claims, 4 Drawing Sheets

(56) References Cited

U.S. PATENT DOCUMENTS

| | | | | |
|---|---|---|---|---|
| 4,286,423 A * | 9/1981 | Caldwell | ............ | A01D 34/661 56/13.6 |
| 4,397,136 A * | 8/1983 | McLeod | ............ | A01D 34/8355 56/500 |
| 4,581,878 A * | 4/1986 | Vida | ............ | A01D 45/021 460/26 |
| 4,601,162 A * | 7/1986 | Wessel | ............ | A01D 78/1092 56/13.6 |
| 5,330,114 A * | 7/1994 | Trenkamp | ............ | A01D 45/021 241/101.77 |
| 5,513,486 A * | 5/1996 | Le Maigat | ............ | A01D 42/005 56/503 |
| 5,901,538 A * | 5/1999 | Vohl | ............ | A01D 34/662 144/34.1 |
| 5,924,205 A * | 7/1999 | Sugihara | ............ | A01D 34/4167 30/276 |
| 5,941,316 A * | 8/1999 | Mansur | ............ | A01D 34/8355 171/55 |
| 6,412,259 B1 * | 7/2002 | Wiegert | ............ | A01D 45/025 56/60 |
| 7,874,135 B2 * | 1/2011 | Nagy | ............ | A01D 45/021 56/504 |
| 7,937,918 B1 * | 5/2011 | Mossman | ............ | A01D 43/08 56/11.7 |
| 8,261,521 B2 * | 9/2012 | Thompson | ............ | A01D 34/661 56/15.8 |
| 8,646,250 B2 * | 2/2014 | Lohrentz | ............ | A01D 45/025 56/109 |
| 9,198,351 B2 * | 12/2015 | Tilly | ............ | A01D 45/021 |
| 9,210,842 B2 * | 12/2015 | Lohrentz | ............ | A01D 45/025 |
| 9,578,804 B2 * | 2/2017 | Gessel | ............ | A01D 43/08 |
| 9,743,587 B2 * | 8/2017 | Lohrentz | ............ | A01D 45/021 |
| 2004/0187461 A1 * | 9/2004 | Rickert | ............ | A01D 69/00 56/14.2 |
| 2012/0055131 A1 * | 3/2012 | Zegota | ............ | A01D 45/021 56/60 |
| 2016/0007530 A1 * | 1/2016 | Awater | ............ | A01D 34/73 56/52 |
| 2016/0073585 A1 * | 3/2016 | Cook | ............ | A01D 45/028 56/10.8 |

FOREIGN PATENT DOCUMENTS

| | | |
|---|---|---|
| DE | 102004020447 A1 | 12/2005 |
| DE | 102012206720 A1 | 10/2013 |
| DE | 102014213419 A1 | 1/2016 |
| DE | 202016100346 U1 | 2/2016 |
| EP | 0423636 A1 | 4/1991 |
| EP | 0653152 A1 | 5/1995 |

OTHER PUBLICATIONS

DE 102017003739, unpublished application, filed Apr. 19, 2017, including English abstract (15 pages).

* cited by examiner

MULCHING DEVICE FOR PROCESSING PLANT STUBBLE ON A FIELD

CROSS-REFERENCE TO RELATED APPLICATIONS

Pursuant to 35 USC § 119, this application claims the benefit of and priority to German patent application no. 102016213260.1, filed on Jul. 20, 2016, German patent application no. 102016214256.9, filed on Aug. 2, 2016, and German patent application no. 102017207337.3, filed on May 2, 2017, which are herein incorporated by reference in their entirety.

FIELD OF THE DISCLOSURE

The disclosure relates to a mulching device for processing plant stubble on a field, the mulching device being movable in a forward direction over a field and equipped with a plant stubble processing tool that can be set into rotation about an approximately vertical axis of rotation in order to process the plant stubble, and further relates to a harvesting head equipped therewith and to an implement for processing plant stubble on a field.

BACKGROUND

In many cases, mulching devices for comminuting and/or shredding plant stubble remaining on the field after harvesting are attached underneath harvesting heads for harvesting corn, whether for the purpose of protecting the tires of vehicles driving on the field, improving the decomposition of the plant residues or destroying hibernation habitat for corn borers (*Ostrinia nubilalis*). Such mulching devices can also be used in separate machines for processing plant stubble after the harvest.

Cutting tools rotating about the vertical axis (EP 0 423 636 A1, EP 0 653 152 A1, DE 10 2004 020 447 A1) or tools rotating about horizontal axes oriented transversely to the forward direction are typically used for mechanical processing of the corn plant stubble (DE 35 15 295 A1) or blunt, striking tools for destroying the stubble are attached to the underside of cutting discs of mowing and intake devices (DE 10 2012 206 720 A1) or are mounted on a separate machine that is driven across the field after the harvest ("Mais Topper" stubble mulcher from the Major Equipment Company).

The axes of rotation of cutting or beating tools rotating about the vertical axis are arranged exactly vertically during operation or are inclined somewhat forward and upward. As a result, the plant stubble interacts only one time with the tool because after the stubble has been struck by the tool, it will be bent over or cut off. After that, the residues remaining in the ground are deeper than the tool so that there is no possibility of processing a second time with the tool. The efficiency of the tool is therefore relatively limited and relatively large pieces of stubble remain on the field, which can be used by corn bores for hibernation under unfavorable circumstances.

SUMMARY

It would therefore be desirable to increase the degree of comminution of the plant stubble.

A mulching device for processing plant stubble on a field is movable in a forward direction across the field and is equipped with a tool that has an axis of rotation inclined upward and to the rear during operation and can be set into rotation in order to process the plant stubble.

Since the axis of rotation is not precisely vertical or inclined forward as in the prior art, but rather inclined to the rear, the first processing of the plant stubble occurs when the stubble is first struck by the tool at a first height determined by the angle of inclination of the axis of rotation rearward, the height of the axis of rotation above the ground, the diameter of the tool and the lateral offset between the axis of rotation and the plant stubble. The plant stubble is accordingly processed a first time. If the mulching device is now moved further forward across the field, the plant stubble can be processed at least a second time by the tool when it contacts the tool at the rear of the axis of rotation. Owing to the inclination of the axis of rotation, this process takes place at a second height that is less than the first height. If the tool can process the plant stubble not only at the outer end thereof but also between the axis of rotation and the outer end (for example, if it is designed like a razor mower blade, i.e. with a radial cutting edge, or comprises multiple arms of different lengths with striking bodies at the end thereof), it can even interact more than twice with the plant stubble.

The action of the mulching device according to the disclosure on the plant stubble is consequently improved and the latter is cut into smaller parts than in the prior art.

The tool can be designed as a blunt striking tool and/or as a cutting tool. For example, a cutting tool can be arranged higher and/or radially further outward than a blunt striking tool.

The tool can be attached freely rotatably to a shaft driving it that rotates about an axis extending transversely to the forward direction and horizontally, and the shaft can be oriented by guide means relative to the ground into the operating position, wherein it is inclined upwardly and to the rear. Alternatively or additionally, the shaft with the tool can be mounted height-adjustably, in particular by a parallelogram suspension. Thereby the tool automatically follows the contour of the ground and moves relative to the ground about the axis, or is displaced upwards and downwards parallel thereto. The guide means can be a skid running on the ground and coupled to the shaft. The skid and/or a rear cover plate coupled thereto can be equipped with an opening for ejecting plant residue. The shaft can be preloaded to the front and downward by a spring or a weight or an externally operated actuator in order to bring the tool into the desired position.

The proposed mulching device can be attached to a harvesting head for harvesting corn, i.e. a corn picker or a harvesting attachment for harvesting entire corn plants. Multiple tools can be distributed across the width of the harvesting head and can be individually oriented relative to the ground as described in the previous paragraph. A rough height guidance of the harvesting head can be accomplished by a conventionally known height control based on feelers, with which the harvesting head can be pivoted along with the intake channel relative to the harvesting machine about a laterally running axis. The mulching device can also be attached to a separate implement that is moved over the field after harvesting in order to process the plant stubble.

According to a second aspect of the disclosure, a device, in particular a harvesting head, for processing plant stubble on a field is proposed that is equipped with multiple tools for processing plant stubble that are distributed across the width and can be separately oriented, if appropriate, relative to the ground, and that can be driven during operation about an axis inclined relative to the vertical (in any desired direction, e.g. backwards and upwards as described above, or forwards and upwards or to the side), wherein the rotational direction of the tools is selected such that a collision of the tool with the ground or some other obstacle causes a torque acting in a direction so as to raise the tool. This automatically relieves an overload on the tool.

BRIEF DESCRIPTION OF THE DRAWINGS

Multiple embodiments described in detail below are presented in the drawings. In the drawings.

DETAILED DESCRIPTION

Figure 1:
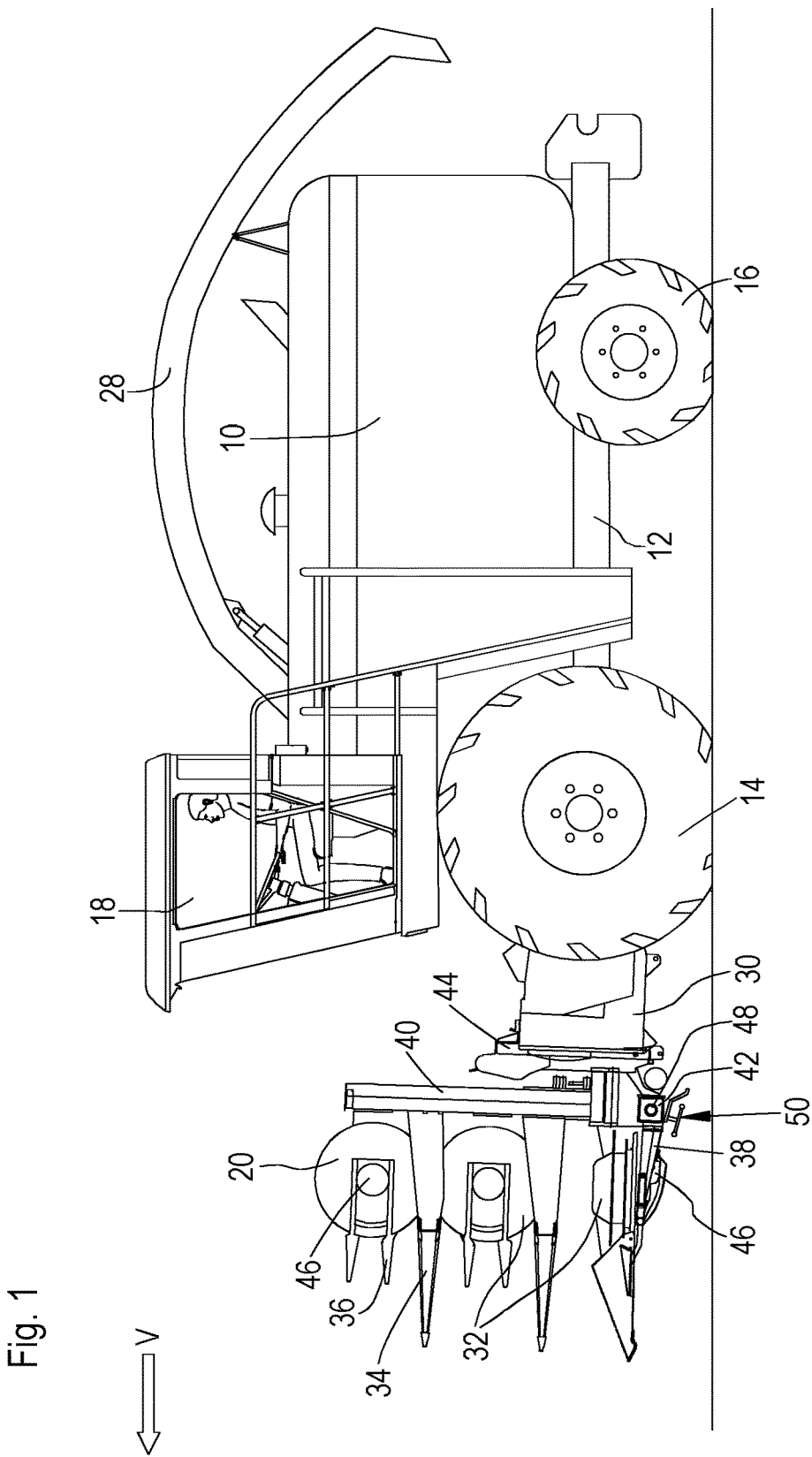
FIG. 1 shows a harvesting machine with a harvesting head on which a mulching device is mounted.

An agricultural harvesting machine 10 of the self-propelled forage chopper type as shown in FIG. 1 is constructed of a frame 12 that is supported by front and rear wheels 14 and 16. The front wheels 14 are used as the main drive wheels, while the rear wheels 16 are steerable. The harvesting machine 10 is operated from a drivers cab 18, from which a harvesting head 20 can be seen. Material, e.g. corn, picked up from the ground by means of a harvesting head 20 is fed via an intake housing 30 to a chopping drum (not shown) in the interior of the harvesting machine 10 that chops the material into small pieces and transfers it to a conveying device (likewise not drawn). Via a height adjustable ejection chute 28 rotatable about the vertical axis, the material exits the harvesting machine 10 to a trailer traveling alongside. A post-comminution device, not shown, can be arranged between the chopping drum and the conveying device. Although the disclosure is shown here on a forage chopper, it can also be used on combines with associated harvesting heads in the form of corn pickers. The directional indications below such as in front of, behind, laterally and above are relative to the forward direction of the harvesting machine 10 and the harvesting head 20, which runs to the left in FIG. 1.

The harvesting head 20, which is mounted at the front end of the harvesting machine 10 in the forward direction, is used for picking up the crop material. The harvesting head 20 in the illustrated embodiment is a conventionally known rotary corn header, which comprises a center part 38 and two side parts 40 arranged laterally to the left and right (relative to the forward direction of the harvesting machine 10) alongside the center part 38. The side parts 40 are mounted pivotably upward on the center part 38 and can be pivoted down hydraulically so that they run parallel to the center part 38 during the harvesting operation. They can subsequently be pivoted upward. The drawing shows the side parts 40 in the upward-pivoted state. Four intake and mowing drums 32 are arranged on the center part 38 in the present embodiment, while two intake and mowing drums 32 are arranged on each of the two side parts 40. The harvesting head 20 is equipped in a conventionally known manner with crop dividers 36, the intake and mowing drums 32, divider tips 34, cover plates and conveying means in order to feed the harvested material to the chopping drum of the harvesting machine 10. During operation, the harvesting head 20 draws in the stalks of mowed material in an upright position, cuts them off and supplies them to the intake housing 30 and subsequently to the chopping drum of the harvesting drum of the harvesting machine 10.

The harvesting head 20 comprises a carrier frame that has a lower crossbeam 42 and an upper crossbeam 44. The lower crossbeam 42 extends at the bottom on the rear side of the harvesting head 20 and comprises three segments, one arranged on the center part 38 and one on each side part 40. Gear unit housings 46, which are used for driving each of the intake and mowing drums 32, are bolted onto the front side of the lower crossbeam 42. A drive shaft 48 for driving the intake and mowing drums 32 via gear units arranged in the gear unit housings 46, which also are used for driving the additional conveying means of the harvesting head 20 and are driven by an output shaft of the harvesting machine 10, extends in the lateral direction inside of the hollow lower crossbeam 42.

The upper crossbeam 44 extends in the lateral direction above the inlet of the intake housing 30 across the width thereof. The upper crossbeam is connected to hook-shaped support elements, under part of which complementary support elements of the intake housing 30 engage, and which are used for mounting the harvesting head 20 on the harvesting machine 10. The upper crossbeam is connected by vertically-extending carrying and connecting plates to the lower crossbeam 42. The carrier frame with the crossbeams 42, 44 and with the vertically-extending beams and connecting plates thus forms a skeleton of the harvesting head 20 that supports all further elements of the harvesting head 20.

Figure 2:
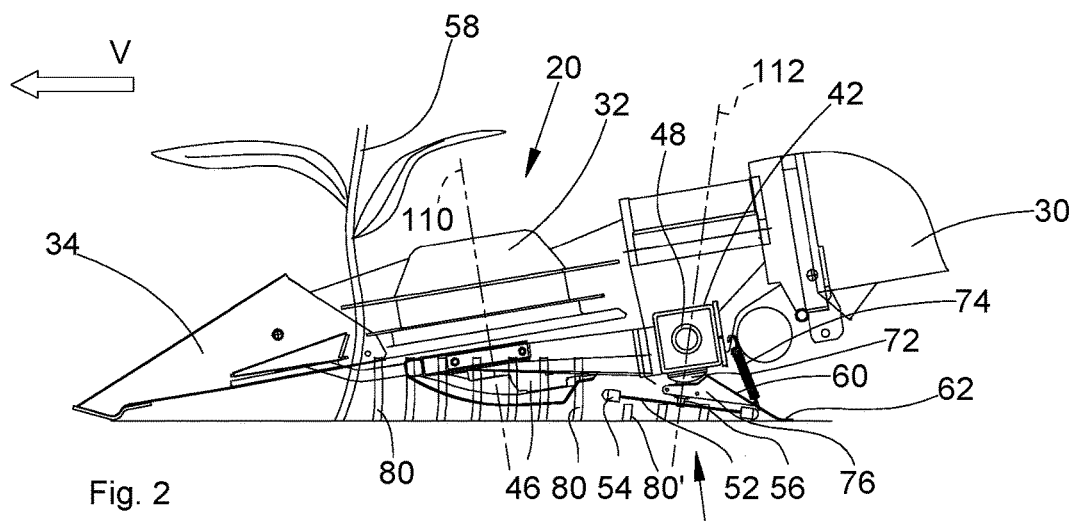
FIG. 2 shows a side view of the harvesting head during harvesting.

FIG. 2 shows the harvesting head 20 in a position that it assumes while harvesting, for which the intake housing 30 is rotated by an actuator (not shown) about the axis of rotation of the chopping drum from the transport position shown in FIG. 1. This actuator also checks the height of the harvesting head 20 above the ground in a conventionally known manner based on feelers.

A respective mulching device 50 is mounted at the rear of each intake and mowing drum 32. The mulching device 50 is arranged with its axis of rotation widthwise to the rear of the axis of rotation of the associated intake and mowing drum 32. That is where the plants are taken in during a normal harvesting operation. If an intake and mowing drum 32 harvests multiple rows of plants, multiple mulching devices 50 can be assigned thereto, of which the axes of rotation are arranged to the rear of expected entry points of the rows of plants. It would also be possible to distribute the mulching devices 50 without gaps or with small gaps over the entire working width of the harvesting head 20.

Figure 3:
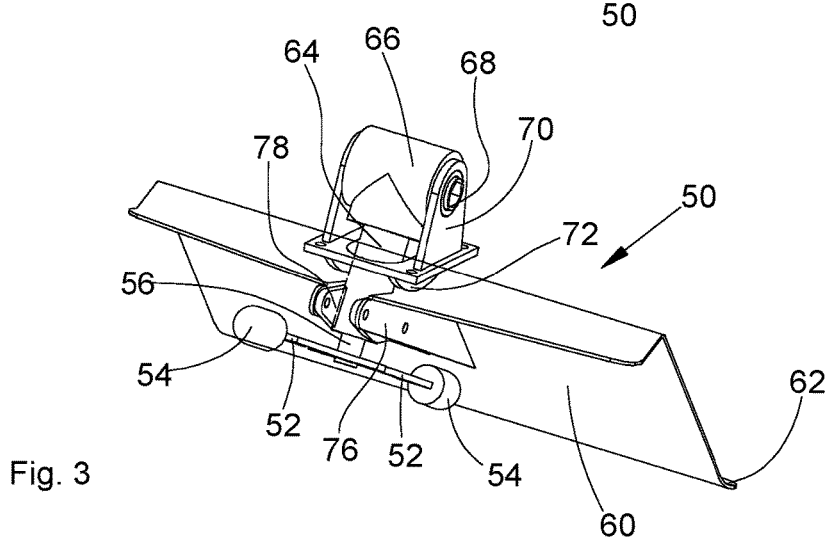
FIG. 3 shows a perspective view of the mulching device.

The reader is now referred to FIGS. 2 and 3. The mulching device 50 comprises two diametrically opposing tools 54 that are rigidly connected to a central shaft 56 via radial arms 52. In place of rigid arms 52, the tools 54 could also be connected to the shaft 56 by chains or other flexible elements. The tools 54 are designed as blunt striking bodies, i.e. spherical or cigar-shaped. Cutting blades of the type typically installed under corn pickers can be used alternatively or additionally as tools 54. These blades can be connected rigidly or pendulously to the shaft 56.

The shaft 56 is connected at the lower end thereof to the arms 52 and mounted at the upper end in a gear unit 66. The drive shaft 48 extends through a hollow shaft 68 of the gear unit 66 and is form-fittingly connected to the hexagonal hollow shaft 68. The gear unit 66 contains driving elements (not shown) such as bevel gears that drivingly connect the hollow shaft 68 to the shaft 56. The gear unit 66 is mounted freely pivotably about the axis of the drive shaft 48 with respect to the drive shaft 48 and the lower crossbeam 42.

The gear unit 66 is additionally connected rigidly to the lower crossbeam 42 by the bracket 70 surrounding it from both sides. A lower plate connecting the two plates of the bracket 70 that are laterally adjacent to the gear unit 66 is connected at the underside of the plate to a stop element 72 that, in cooperation with a cover plate 60, is used to limit the movement range of the shaft 56 and thus the tools 54 and to avoid collisions with other parts of the harvesting head 20.

A hollow axle 64, which concentrically encloses the shaft 56 between the gear unit 66 and a lower end lying slightly above the arms 52, is mounted on the housing of the gear unit 66. The hollow axle 64 with the gear unit 66 and the shaft 56 can be pivoted freely relative to the lower crossbeam 42 about the longitudinal axis of the drive shaft 48. The hollow axle 64 bears at the lower end thereof a flange 78 on which a mounting 76 is positioned. The mounting 76 is rigidly connected to the cover plate 60. The cover plate 60 extends over the width of the mulching device 50 and is somewhat broader than the diameter of the envelope circle described by the tools. The cover plate 60 extends in the forward direction V from the center of the hollow axle 64 and from there obliquely to the rear and downward up to a rear skid 62 that bears against the ground. A (compression) spring 74 is connected between the carrying frame of the harvesting head 20 and the cover plate 60 and presses the cover plate 60 downward. To adapt to the evenness of the ground, the skid 62 can be adjustable relative to the cover plate 60 (and/or the cover plate 60 relative to the hollow axle 64) in order to place the tools 54 further downward in their rear position than if the ground is more uneven. The spring 74 could also be replaced or assisted by an actuator that guides the cover plate above the ground with a predetermined force and can be used to lift the cover plate if necessary, whether automatically, e.g. when the mulching device 50 is not being used, or at the headland or when driving in reverse, or by an operator command. The reader is referred in this regard to the disclosure of DE 10 2017 003 739 A1.

All of this yields the following mode of operation: The spring 74 or the actuator presses the cover plate 60 and thus also the skid 62 downward until the latter contacts the ground. The cover plate 60 also turns the gear unit 66 about the longitudinal axis of the drive shaft 48 via the mounting 76, the flange 78 and the hollow axle 64. This rotation is finally transmitted via the gear unit 66, the shaft 56 and the arms 52 to the tools 54. The axis of rotation defined by the shaft 56, about which the tools 54 rotate in operation, is inclined to the rear and upward, as shown in FIG. 2. This has the effect that the plant stubble 80 of the harvested plants 58, the height of which is initially determined by the height above the ground of the cutting discs of the intake and mowing drums 32, is seized in the front region of the mulching device 50 by a tool 54 for the first time. The already processed (knocked off) and shortened plant stubble 80' remaining in the soil is subsequently processed a second time in the rear area of the mulching device 50 by one of the tools 54 and cut off close to the ground. The processing quality of the plant stubble is accordingly considerably improved. To further improve the action, the leading edge of the arms 52 could be equipped with blades. The described adaptation to the ground is done individually for each mulching device 50 of the harvesting head 20.

A further advantage of the freely swinging suspension of the shaft 56 and the tools 54 and of the ground contour-following position control thereof by means of the skid 62 is that, with a suitable rotational direction of the shaft 56, in the event that the tools 54 inadvertently penetrate into the ground or a clump of dirt, the resulting torque that the tools 54 exert onto the ground in this case due to being driven via the shaft 56 will turn the shaft 56 to the rear and upwards about the longitudinal axis of the drive shaft 48 and thus the tools will work their way out of the ground automatically. If no processing of the plant stubble 80 is intended, the mulching device 50 can be removed from the harvesting head 20, or the shaft 56 is disconnected by a clutch or the like from the drive shaft 48 or the arms 52 are removed from the shaft 56.

Figure 4:
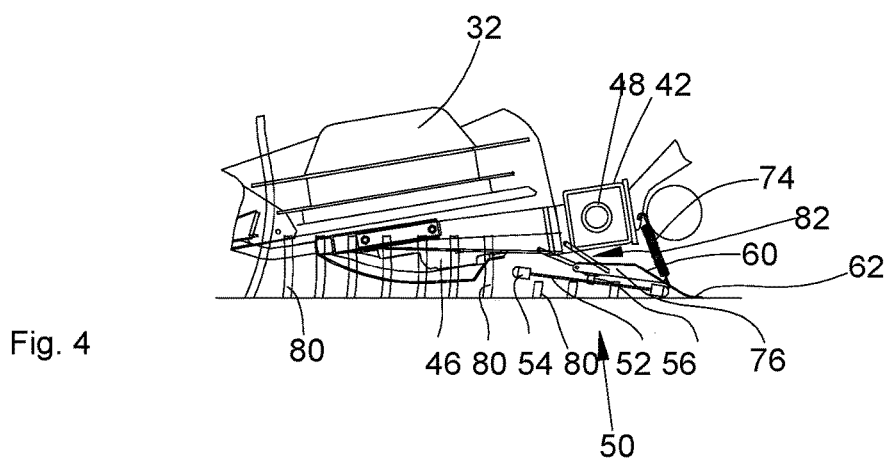
FIG. 4 shows a side view of a harvesting head with a second embodiment of a mulching device.

In the second embodiment of the mulching device 50, which is shown in FIG. 4, the shaft 56 is not pivotable about the longitudinal axis of the drive shaft 48, but is instead supported in parallel and height-adjustably on the harvesting head 20 by a parallelogram arrangement 82 having two links, each articulated at one end, pivotably about axes running horizontally and transversely relative to the forward direction, on the frame of the harvesting head 20 or on the gear unit 46 or at some other suitable point coupled to the harvesting head 20, and at the other end on the bracket 76. The shaft 56 can be driven by an electric or hydraulic motor associated with the respective mulching device 50, or by a mechanical drive train derived from the gear unit 46 or the drive shaft 48. Here too, the rotational direction of the shaft 56 is selected such that, under an overload against the force of the spring 74, the tool 54 can work its way out of the ground due to the drive torque. This advantage can be achieved even if the axis of rotation of the shaft 56 is not inclined to the rear and upward, but is instead inclined forward and upward or to the side.

Figure 5:
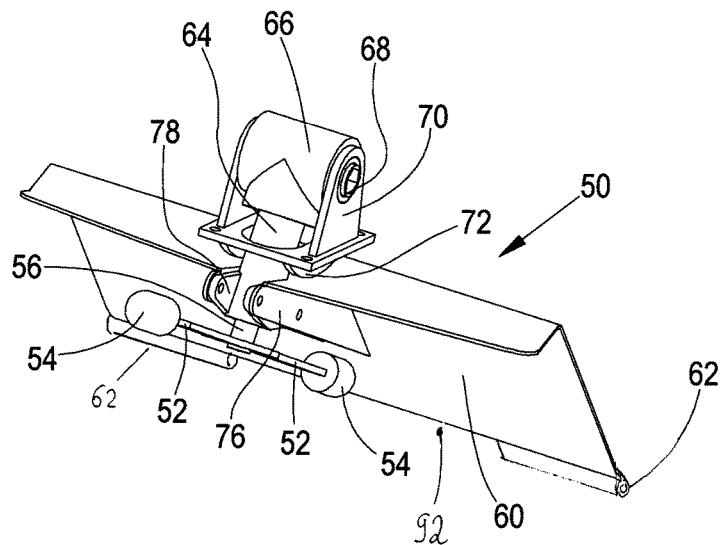
FIG. 5 shows a perspective view of a third embodiment of a mulching device.

FIG. 5 shows a third embodiment of the mulching device 50, which corresponds substantially to that of FIG. 3. Different from the latter, however, the skid 62 formed from a pipe does not extend over the entire width of the cover plate 60, but only at the lateral borders thereof. In the central region of the cover plate 60, a lower opening 92 close to the ground remains, from which the comminuted plant parts are ejected to the rear and do not accumulate underneath the cover plate 60. The cover plate 60 of FIG. 5 with the opening 92 can also be used with the embodiment according to FIG. 4.

Figure 6:
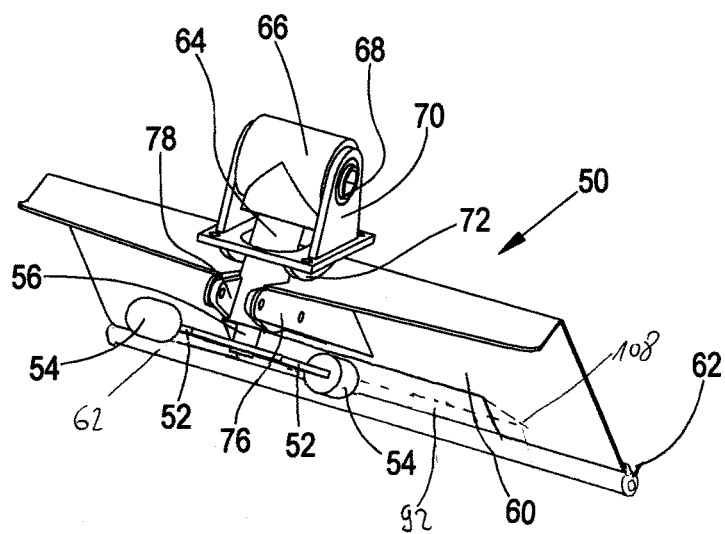
FIG. 6 shows a perspective view of a fourth embodiment of a mulching device.

FIG. 6 shows a fourth embodiment of the mulching device 50, which corresponds substantially to that of FIG. 5. Differing from the latter, however, the skid 62 formed from a pipe extends over the entire width of the cover plate 60, while a cutout 92 is provided in the central region of the cover plate 60, directly above the skid 62 extending gap-free over the entire width of the cover plate 60. This cutout 92 can also be covered towards the top and the rear by an optional flap 108, which adjoins the upper edge of the cutout 92 to the rear and is adjusted to be flatter than the cover plate 60. The flap 108 can be rigid or the upper end thereof can be articulated on the cover plate 60 adjustably and pivotably about an axis running transversely. The flap 108 prevents plant residues from being thrown upward and to the rear and striking the harvesting machine 10 or the wheels 14. A lower opening 92 close to the ground, from which the comminuted plant parts are ejected to the rear and do not accumulate underneath the cover plate 60, remains above the skid 62 in the central region of the cover plate 60. The cover plate 60 of FIG. 6 with the opening 92 can also be used with the embodiment according to FIG. 4. The embodiments of FIGS. 5 and 6 can also be combined, i.e. the skid 62 of FIG. 6 can be interrupted in the center as in FIG. 5.

Figure 7:
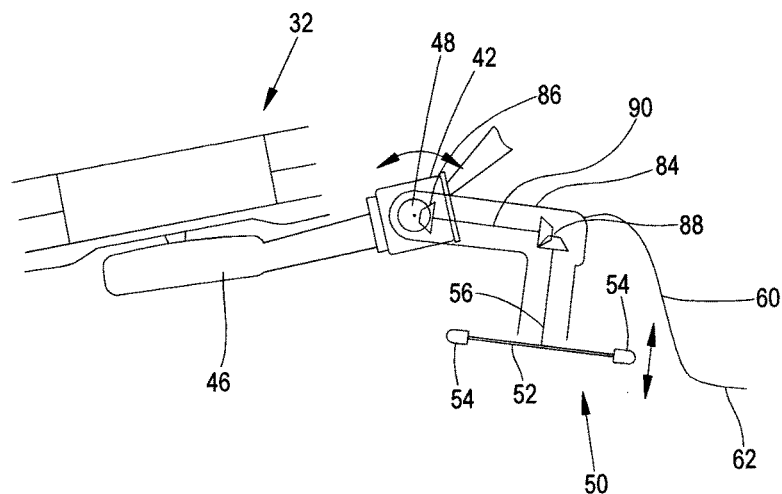
FIG. 7 shows a side view of a fifth embodiment of the mulching device.

The fifth embodiment, as shown in FIG. 7, corresponds approximately to that of FIG. 1-3 or 5, but the shaft 56 is shifted to the rear in relation to the crossbeam 42 and is driven by the drive shaft 48 via a first bevel gear unit 86, a shaft 90 extending to the rear therefrom, and a second bevel gear unit 88, which are located inside of a housing 84. The housing 84 is freely rotatable relative to the crossbeam 42 about the longitudinal axis of the drive shaft 48 and is connected via the cover plate 60 to the skid 62. The torque for orienting the mulching device 50 in the desired position can provided as shown only by the weight of the housing 84 and the gear unit 88, or a spring 74 can additionally be used, as in the other illustrated embodiments. It should further be noted that in the embodiment according to FIG. 6, the housing 84 could be articulated to the gear unit 46 (rather than the crossbeam 42) pivotable freely about the horizontal axis running transversely to the forward direction, and the shaft 90 could be driven by a drive shaft of the gear unit 46.

Figure 8:
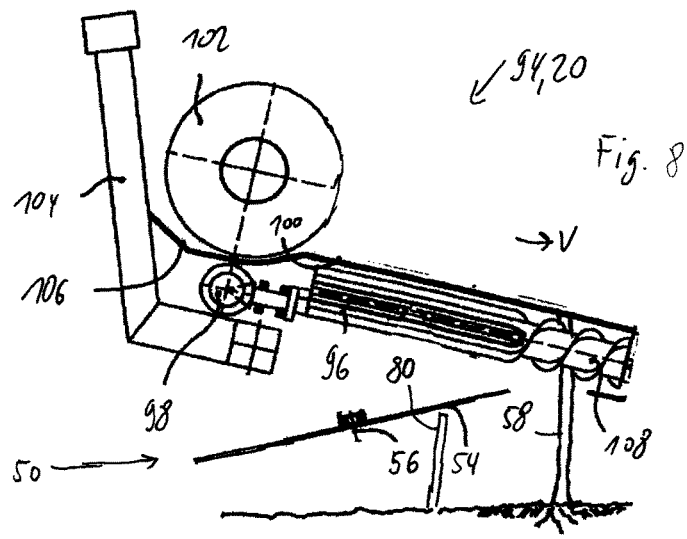
FIG. 8 shows a side view of a corn picker having a sixth embodiment of a mulching device.

Finally, FIG. 8 shows a sixth embodiment of a mulching device 50, which is arranged underneath a harvesting head 20 in the form of a corn picker 94, which is equipped in the conventional manner with a frame 104, a transverse conveying auger 102 supported on the frame 104, a depression 106 arranged thereunder, a stripper plate 100, in which a picking gap is formed and which is arranged in front of the transverse conveying auger 102, and a pair of picking rollers 96, which are driven via a gear unit 98 and are furnished at the front ends thereof with intake augers 108. Here too, the tool 54 can be driven about a shaft 56, the axis of which extends to the rear and upward. In this embodiment, the tools 54 are designed as radially extending cutters, as are common for stem choppers of corn pickers (cf. DE 10 2014 213 419 A1), although tangential cutters can additionally be provided. The tools 54, the envelope circle of which coincides with the plucking gap, are used in this embodiment, particularly in the region thereof in front of the shaft 56, to chop up the stalks of the plants 58 conveyed downward by picking rollers 96, while in the region of the tools behind the shaft 56, they comminute the stubble 80 of the plants 58 remaining in the ground. Accordingly the tools 54 interact multiply with the stalks of the plants 58 here as well, due to the orientation of the axis of rotation of the shaft 56. The shaft 56 in the embodiment according to FIG. 8 can be driven by the gear unit 98 via a bevel gear 88, analogously to FIG. 7. Finally it should be noted that the shaft 54 in the corn picker 94 of FIG. 7 can be arranged rigidly relative to the frame 104 thereof, or the ground-copying arrangement of the tools 54 from the embodiments of FIGS. 1-7 can also be provided in the embodiment according to FIG. 8.

Figure 9:
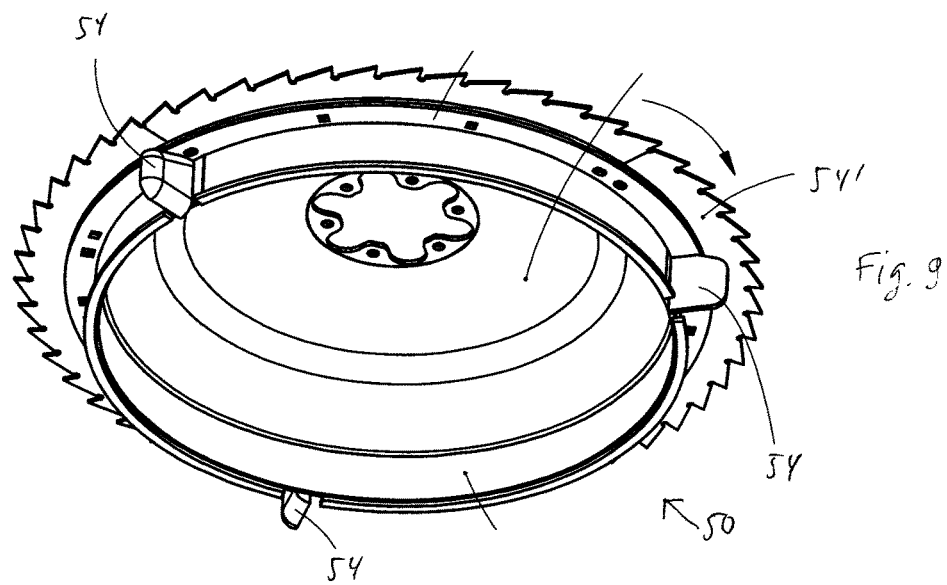
FIG. 9 shows a perspective view of a tool for use in a mulching device.
Figure 10:
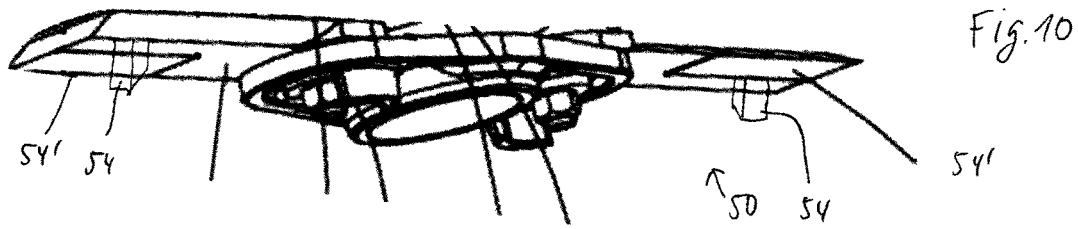
FIG. 10 shows a perspective view of a different tool for use in a mulching device.

FIGS. 9 and 10 show two possible embodiments of the tools 54 of the mulching devices 50, as can be used in the previously shown embodiments of FIGS. 1-8. In the embodiment of FIG. 9, an upper tool 54' in the form of a circular saw blade is provided, under which lower tools 54 in the form of blunt striking bodies are distributed. In the embodiment of FIG. 10, upper tools 54' in the form of radially extending cutters of the type common in the stem choppers of corn pickers (cf. DE 10 2014 213 419 A1) are provided, and lower tools 54 in the form of blunt striking bodies are attached under the cutters. The illustrated arrangement of upper, cutting tools 54', which protrude in the radial direction past the lower tools 54, has the advantage for a rotational axis of the mulcher 50 that is inclined to the rear and upward that the cutting tools 54' first interact at the front side of the mulcher 50 with the still-standing plants, or the stubble thereof, and shorten it. In the rear area of the mulcher 50, the remaining plant stalks are then disintegrated by the lower blunt tools 54. The cutting tools 54' remain at a larger distance from the ground and scarcely come into contact with it, which increases their service life.

The invention claimed is:

1. A harvesting machine for harvesting crop, the harvesting machine comprising:
    a frame;
    a harvesting head attached to a front end of the frame relative to a direction of travel when harvesting crop, the harvesting head including:
        a carrier frame;
        at least one mowing drum attached to and supported by the carrier frame, wherein an axis of rotation of the at least one mowing drum extends substantially vertically and is inclined forward relative to the direction of travel when harvesting crop in a crop harvesting position;
        at least one mulching device attached to and supported by the carrier frame, and disposed rearward of the at least one mowing drum relative to the direction of travel when harvesting crop;
        wherein the at least one mulching device includes a shaft rotatable about an axis of rotation that extends substantially vertically and is inclined rearward relative to the direction of travel when harvesting crop in the crop harvesting position.

2. The harvesting machine set forth in claim 1, wherein the at least one mulching device includes a tool attached to and disposed substantially orthogonal to the shaft when in an operating position.

3. The harvesting machine set forth in claim 2, wherein the tool includes a blunt striking tool.

4. The harvesting machine set forth in claim 2, wherein the tool includes a cutting tool.

5. The harvesting machine set forth in claim 1, wherein the carrier frame includes a lower crossbeam with the mulching device rotatably attached to the lowed crossbeam for movement about an axis disposed transverse to the direction of travel while harvesting crop.

6. The harvesting machine set forth in claim 5, wherein the harvesting head includes a compression spring interconnecting the carrier frame and the at least one mulching device, and operable to bias a rearward end of the at least one mulching device downward to maintain the rearward inclination of the axis of rotation of the shaft.

* * * * *